US008385325B2

(12) United States Patent
Vafin et al.

(10) Patent No.: US 8,385,325 B2
(45) Date of Patent: Feb. 26, 2013

(54) METHOD OF TRANSMITTING DATA IN A COMMUNICATION SYSTEM

(75) Inventors: Renat Vafin, Tallinn (EE); Jonas Lindblom, Solna (SE); Markus Vaalgamaa, Helsinki (FI)

(73) Assignee: Skype, Dublin (IE)

( * ) Notice: Subject to any disclaimer, the term of this patent is extended or adjusted under 35 U.S.C. 154(b) by 1436 days.

(21) Appl. No.: 12/005,040

(22) Filed: Dec. 21, 2007

(65) Prior Publication Data

US 2008/0232353 A1    Sep. 25, 2008

(30) Foreign Application Priority Data

Mar. 20, 2007 (GB) .................................... 0705329.1

(51) Int. Cl.
*H04L 12/66* (2006.01)
*H04L 7/00* (2006.01)
*H04J 3/06* (2006.01)

(52) U.S. Cl. .......................... 370/352; 370/516; 375/371
(58) Field of Classification Search .......... 370/352–356, 370/516, 395.21, 508, 517, 519; 375/371
See application file for complete search history.

(56) References Cited

U.S. PATENT DOCUMENTS

| 5,619,566 | A | 4/1997 | Fogel |
| 6,526,140 | B1 | 2/2003 | Marchok et al. |
| 6,754,342 | B1 * | 6/2004 | Surazski et al. ............... 379/421 |
| 6,829,244 | B1 * | 12/2004 | Wildfeuer et al. ............ 370/412 |
| 7,058,568 | B1 | 6/2006 | Lewis |
| 7,447,195 | B1 * | 11/2008 | Chan et al. ..................... 370/352 |
| 2003/0050786 | A1 * | 3/2003 | Jax et al. ........................ 704/500 |
| 2004/0081106 | A1 * | 4/2004 | Bruhn ............................ 370/276 |
| 2006/0045138 | A1 | 3/2006 | Black et al. |
| 2006/0218636 | A1 * | 9/2006 | Chaum ........................... 726/22 |

FOREIGN PATENT DOCUMENTS

| WO | WO 02/091570 A1 | 11/2002 |
| WO | WO 2005/009019 A2 | 1/2005 |

OTHER PUBLICATIONS

International Search Report, PCT/IB2007/004505, date of mailing Sep. 18, 2008.
International Search Report and Written Opinion of the International Searching Authority from PCT/IB2007/004505, date of mailing Nov. 7, 2008.

* cited by examiner

*Primary Examiner* — Chandrahas Patel
*Assistant Examiner* — Joel Hamel
(74) *Attorney, Agent, or Firm* — Wolfe-SBMC (57) ABSTRACT

A method of receiving at a terminal a first signal transmitted via a communication network, said method comprising the steps of; receiving at the terminal the first signal comprising a plurality of data elements; analysing characteristics of the first signal; receiving from a user of the terminal a second signal to be transmitted from the terminal; analysing characteristics of the second signal to detect audio activity in the second signal; and applying a delay between receiving at the terminal and outputting from the terminal at least one of said plurality of data elements; and adjusting the delay based on the analysed characteristics of the first signal and on the detection of audio activity in the second signal.

30 Claims, 6 Drawing Sheets

METHOD OF TRANSMITTING DATA IN A COMMUNICATION SYSTEM

RELATED APPLICATION

This application claims priority under 35 U.S.C. §119 or 365 to Great Britain, Application No. 0705329.1, filed Mar. 20, 2007. The entire teachings of the above application are incorporated herein by reference.

TECHNICAL FIELD

The present invention relates to communication systems. More particularly the present invention relates to a method and apparatus for receiving and decoding data in a communication system.

BACKGROUND

In a communication system a communication network is provided, which can link together two communication terminals so that the terminals can send information to each other in a call or other communication event. Information may include speech, text, images or video.

Modern communication systems are based on the transmission of digital signals. Analogue information such as speech is input into an analogue to digital converter at the transmitter of one terminal and converted into a digital signal. The digital signal is then encoded and placed in data packets for transmission over a channel to the receiver of another terminal.

One type of communication network suitable for transmitting data packets is the internet. Protocols which are used to carry voice signals over an Internet Protocol network are commonly referred to as Voice over IP (VoIP). VoIP is the routing of voice conversations over the Internet or through any other IP-based network.

A data packet includes a header portion and a payload portion. The header portion of the data packet contains data for transmitting and processing the data packet. This information may include an identification number and source address that uniquely identifies the packet, a header checksum used to detect processing errors and the destination address. The payload portion of the data packet includes information from the digital signal intended for transmission. This information may be included in the payload as encoded frames such as voice frames, wherein each frame represents a portion of the analogue signal.

Degradations in the channel on which the information is sent will affect the information received at the receiving terminal. Degradations in the channel can cause changes in the packet sequence, delay the arrival of some packets at the receiver and cause the loss of other packets. The degradations may be caused by channel imperfections, noise and overload in the channel. This ultimately results in a reduction of the quality of the signal output by the receiving terminal.

When data packets are received at the destination terminal, the information provided in the header of each packet is used to order the received data packets in the correct sequence. In order to ensure that the data in the data packets may be output continuously at the destination terminal, it is necessary to introduce a delay between receiving a data packet and outputting the data in the packet, in order to overcome random variations in the delay between packets arriving at the terminal.

A jitter buffer is used at the receiving terminal to order the data packets in the correct sequence and to allow for the concealment of the variations in the propagation of the data packets. The jitter buffer is placed on the receiving path of the terminal and receives incoming data packets from the network. The jitter buffer buffers the incoming packets by introducing a delay before outputting data from the packets. Typically the jitter buffer adapts the delay according to the rate at which the packets are received from the network. The jitter buffer is also arranged to reorder the packets that arrive out of sequence into the correct sequence and to discard packets that arrive too late to be included in the correct sequence. Increasing the delay introduced by the jitter buffer reduces the number of packets that arrive too late to be included in the correct sequence. Increasing the delay introduced by the jitter buffer also conceals larger delays in the propagation of the data packets.

The function of the jitter buffer may however adversely affect the communication between the terminals. For example, if the delay introduced by the jitter buffer is too great this will adversely affect the interactivity of the real time communication.

Furthermore adapting the delay introduced by the jitter buffer will result in playing parts of the received signal either faster or slower, causing a distortion of the output signal. Although this problem may be overcome to some extent by adapting the jitter buffer delay during periods when there is no voice activity detected on the incoming signal, this limits the extent to which the jitter buffer delay may be adjusted.

It is therefore an aim of the present invention to improve the perceived quality of the received signal. It is a further aim of the present invention to provide a method of improving the quality of the received signal without the use of complex computational methods.

SUMMARY

According to a first aspect of the present invention there is provided a method of receiving at a terminal a first signal transmitted via a communication network, said method comprising the steps of; receiving at the terminal the first signal comprising a plurality of data elements; analysing characteristics of the first signal; receiving from a user of the terminal a second signal to be transmitted from the terminal; analysing characteristics of the second signal to detect audio activity in the second signal; and applying a delay between receiving at the terminal and outputting from the terminal at least one of said plurality of data elements; and adjusting the delay based on the analysed characteristics of the first signal and on the detection of audio activity in the second signal.

According to a second aspect of the present invention there is provided a method of receiving at a terminal a first signal transmitted via a communication network, said method comprising the steps of; receiving at the terminal the first signal comprising a plurality of data elements; analysing characteristics of the first signal; detecting if a voice inactivity condition is present for an input of said terminal; determining a required delay based on the analysed characteristics of the first signal; applying a delay between receiving at the terminal and outputting from the terminal at least one of said plurality of data elements; and increasing the delay if it is determined that the voice inactivity condition is present.

According to a third aspect of the present invention there is provided a method of receiving at a terminal a first signal transmitted via a communication network, said method comprising the steps of; receiving the first signal at the terminal; receiving from a user of the terminal a second signal to be transmitted from the terminal; analysing characteristics of the second signal to detect audio activity in the second signal;

applying a processing step to at least a portion of the first signal, in dependence on whether audio activity is detected in the second signal; and outputting said first signal from the terminal.

According to a fourth aspect of the present invention there is provided a terminal arranged to receive a first signal transmitted via a communication network, said terminal comprising; a first receiver arranged to receive the first signal comprising a plurality of data elements; a first analysis unit arranged to analyse characteristics of the first signal; a second receiver arranged to receive from a user of the terminal a second signal to be transmitted from the terminal; a second analysis unit arranged to analyse characteristics of the second signal to detect audio activity in the second signal; a delay unit arranged to apply a delay between receiving at the terminal and outputting from the terminal at least one of said plurality of data elements and to adjust the delay based on the analysed characteristics of the first signal and on the detection of audio activity in the second signal.

According to a fifth aspect of the present invention there is provided a terminal arranged to receive a first signal transmitted via a communication network, said terminal comprising; a first receiver arranged to receive the first signal comprising a plurality of data elements; an analysis unit arranged to analyse characteristics of the first signal; a second receiver arranged to receive a second signal to be transmitted from the terminal; a detector arranged to detect if a voice inactivity condition is present for the second receiver of said terminal; a delay unit arranged to apply a delay between receiving at the terminal and outputting from the terminal at least one of said plurality of data elements and to increase the delay if it is determined that the voice inactivity condition is present.

According to a sixth aspect of the present invention there is provided a terminal arranged to process a first signal transmitted via a communication network, comprising; a first receiver arranged to receiving the first signal at the terminal; a second receiver arranged to receive from a user of the terminal a second signal to be transmitted from the terminal; an analysis unit arranged to analyse characteristics of the second signal to detect audio activity in the second signal;

a processor arranged to apply a processing step to at least a portion of the first signal, in dependence on whether audio activity is detected in the second signal; and an output arranged to output said first signal from the terminal.

BRIEF DESCRIPTION OF THE DRAWINGS

For a better understanding of the present invention and to show how the same may be carried into effect, embodiments of the present invention will now be described with reference to the following drawings.

DETAILED DESCRIPTION OF THE INVENTION

Figure 1:
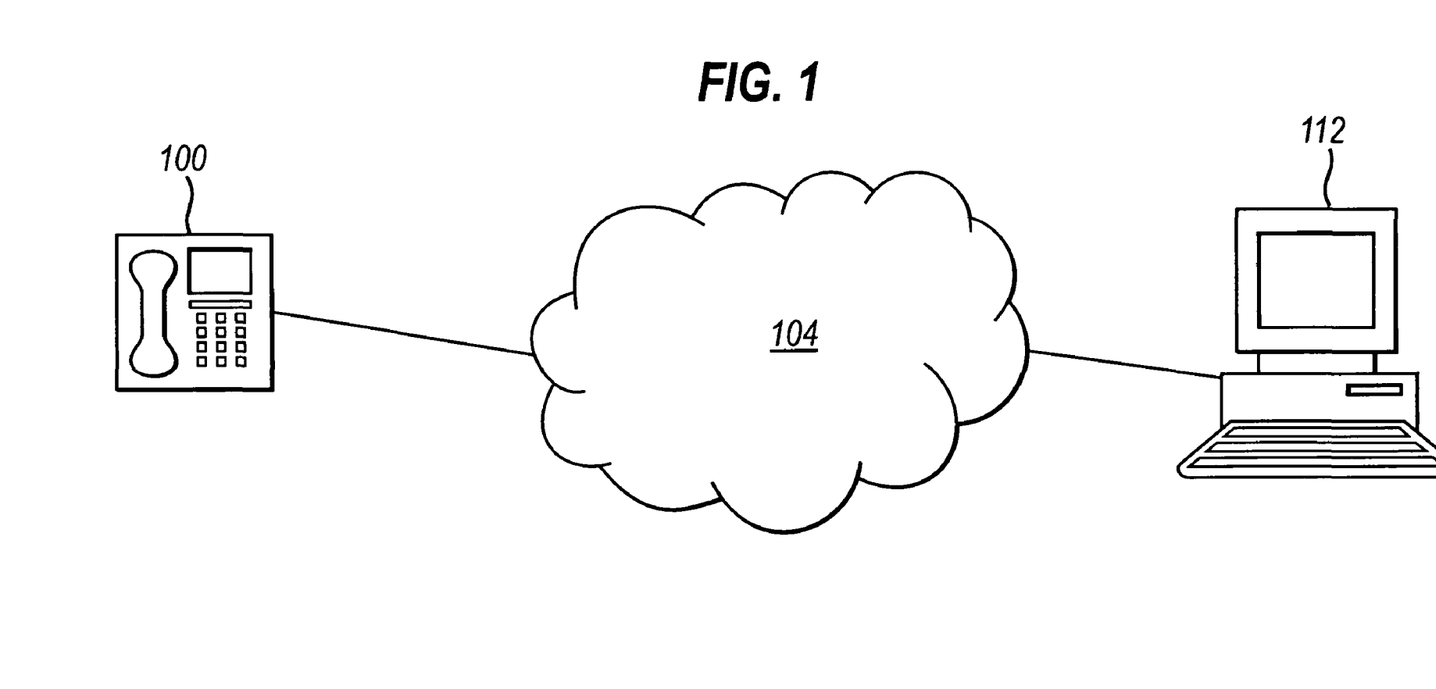
FIG. 1 is a diagram showing a communication network.

Reference will first be made to FIG. 1, which shows a terminal 100 and a terminal 112 connected to a communication network 104. The terminal 100 is arranged to transmit data to the terminal 112 via the communication network 104. In one embodiment of the invention the communications network is a VoIP network provided by the internet. It should be appreciated that even though the exemplifying communications system shown and described in more detail herein uses the terminology of a VoIP network, embodiments of the present invention can be used in any other suitable communication system that facilitates the transfer of data. For example, in an alternative embodiment of the invention the communication network may be a PSTN (Public Switched Telephone Network) or a GSM (Global System for Mobile Communications) network.

The terminals 100 and 112 may be, for example, a personal computer, a gaming device, a personal digital assistant, a suitably enabled mobile phone, a television or other device able to connect to the network 104.

Figure 2:
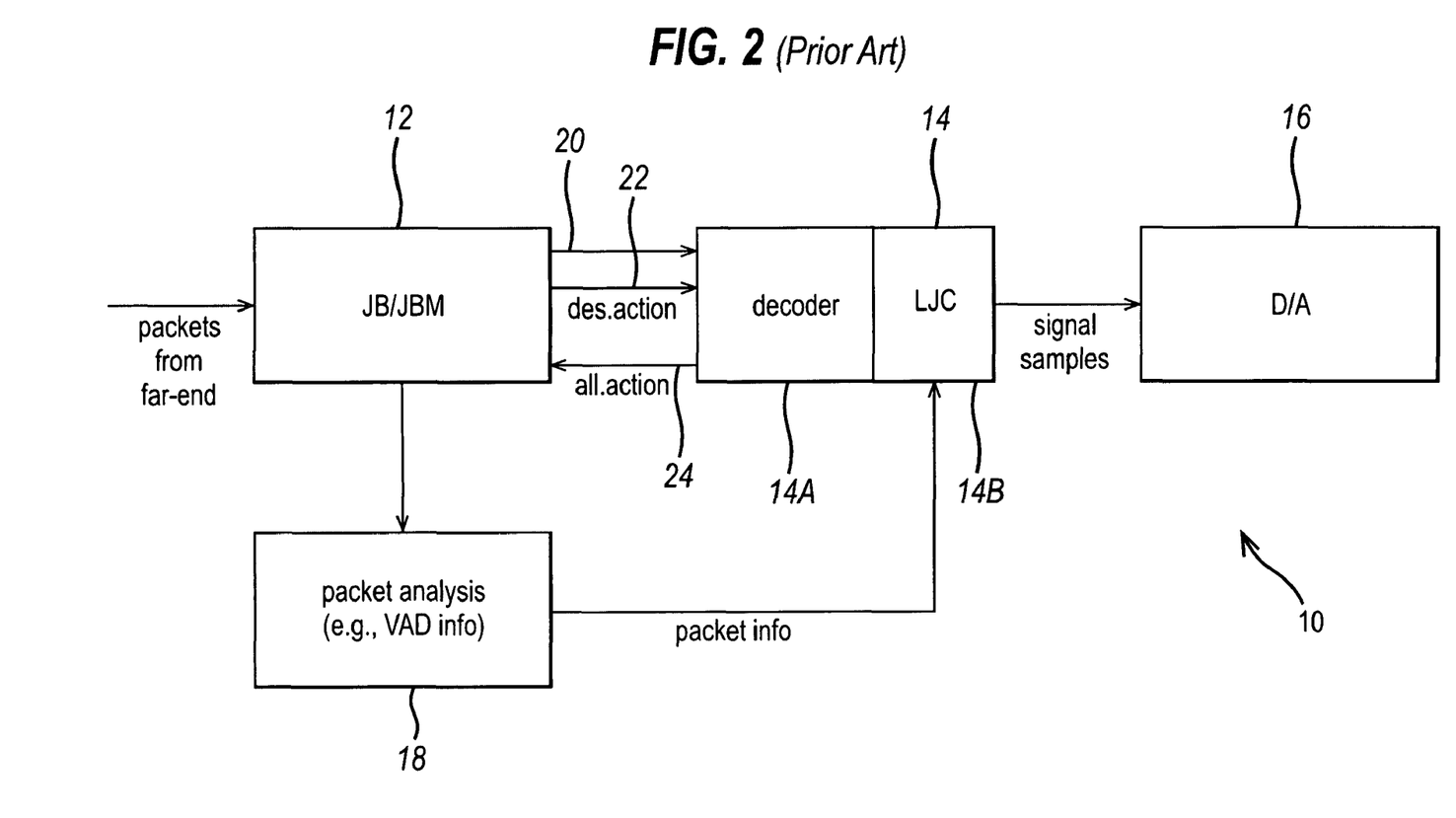
FIG. 2 is a diagram showing receiving circuitry according to the prior art.

FIG. 2 shows an example of receiving circuitry 10 in the terminal 112 used to receive data packets transmitted from the terminal 100, according to the prior art. The following description shall consider the delay introduced by the jitter buffer of the terminal 112. The terminal 112 shall therefore be referred to as the near end terminal 112 and the terminal 100 shall be referred to as the far end terminal 100. The signal containing the data packets transmitted from the far end terminal 100 will be referred to as the far end signal.

The receiving circuitry includes a jitter buffer block 12, a decoder block 14, a digital to analogue converter 16 and a voice activity detector 18. The jitter buffer block 12 receives data packets from the terminal 100 via the network 104. The jitter buffer block 12 comprises a jitter buffer storage arranged to temporarily store data packets received from the network, and a jitter buffer manager that is arranged to reorder packets that arrive out of sequence and to discard late packets. The data provided in the payload of the packets is output to the decoder block 14 in the form of a bit stream, as shown by connection 20.

The jitter buffer manager is also arranged to calculate the delay that should be applied to the data before the data is output to a user of the near end terminal 112. This delay may be based on the rate at which the data packets are received from the network and the delay applied previously to data in the decoder block 14 as described hereinafter. The calculated delay is reported to the decoder block 14 as shown by connection 22.

The decoder block 14 receives the bit stream output from the jitter buffer block 12. The decoder block also receives an input from the voice activity detector 18. The decoder block 14 comprises a decoder 14a that decodes the packets according to the encoding scheme that was used by the far end terminal to encode the data. The decoder block 14 also includes a loss-and-jitter concealment (LJC) unit 14b that analyses the signal and applies a delay to the signal. The decoder 14a and the LJC unit 14b are shown as composite parts of the decoder block 14 as the LJC unit 14b may be integrated with the decoder 14a.

The delay applied to the signal by the LJC unit 14b is increased or decreased according to the delay provided from the jitter buffer block on connection 22. The LJC unit may adjust the delay by either inserting a copy of a previous frame to increase the delay or by skipping a frame to decrease the delay. Alternatively the LJC unit may adjust the delay by adjusting the play out duration of each frame. For example, if the frame length is 20 ms the LJC unit may stretch the frame to 30 ms to increase the delay by 10 ms, or compress the frame to 10 ms to decrease the delay by 10 ms.

The extent to which the LJC unit 14b may stretch or compress the signal according to the desired delay input from the jitter buffer unit is dependent on the characteristics of the signal. The LJC unit may stretch or compress the signal during periods of silence detected by the voice activity detector 18.

The voice activity detector 18 receives an input from the jitter buffer block 12. The information provided to the voice activity detector 18 typically comprises an identical bit stream to the bit stream provided to the decoder block 14. The voice activity detector is arranged to analyse information in the bit stream to detect intervals of voice inactivity in the far end signal. The periods of voice inactivity are reported by the voice activity detector 18 to the LJC unit 14b of the decoder block 14. The LJC unit 14b compresses or stretches the signal to apply the time delay calculated by the jitter buffer manager during periods of voice inactivity, so that modifications to the delay are less audible in the signal.

Since it is also sometimes necessary to adapt the delay during periods of voice activity, the LJC unit may also analyse the signal to determine periods of voice activity during which the delay may be adjusted without causing significant audible distortion. In this case characteristics of the far end signal may also be used by the LJC unit 14b to determine the type of speech sound in the signal. For example the signal may be stretched during stable speech sounds such as the 's' sound in 'sing' or the 'a' sound in 'car', but not during plosive speech sounds such as the 'k' sound in 'kid'.

The delay actually applied to the data is reported by the decoder block 14 to the jitter buffer block 12 as shown by the connection 24.

The decoded data is output as a digital signal from the decoder block 14 to the digital to analogue converter 16. The digital to analogue converter 16 converts the decoded digital signal to an analogue signal. The analogue signal may then be output by an output device such as a loudspeaker.

The inventors of the present invention have identified that it is advantageous to control the delay introduced into the far end signal based on the detection of audio activity in the signal to be transmitted from the near end terminal 112, otherwise referred to as the near end signal.

According to an embodiment of the invention the delay introduced at the near end terminal 112 between receiving and outputting information transmitted in the far end signal is controlled in response to characteristics of the near end signal.

In a preferred embodiment of the invention, audio activity in the near end signal relates to voice activity.

Controlling the delay in response to information on the near end signal allows the delay to be adapted based on the voice activity of the near end user. This is particularly advantageous when applied to the transmission of speech during a conversation between a user of the far end terminal 100 and a user of the near end terminal 112.

For example, if it is determined that the near end user has remained silent for a period of time the delay introduced to the far end signal by the near end terminal 112 may be controlled to be longer than that calculated by the jitter buffer manager. This minimizes the amount of late packets that arrive at the terminal 112. Conversely if the user of the terminal 112 is talking, the delay introduced to the far end signal by terminal 112 may be controlled to be less than that calculated by the jitter buffer manager.

An advantage of adapting the jitter buffer delay based on the near end signal may be illustrated by the example of a teacher who speaks for long periods and a student who rarely speaks. According to the present invention, the delay introduced to the data received by the student's terminal would be allowed to increase. This would prevent information transmitted from the teacher being lost. However the delay introduced to the data received by the teacher's terminal would be lower than the delay introduced to the data received by the student's terminal. This would allow the student to still interrupt the teacher quickly.

When the student speaks, speech will be detected in the signal transmitted from the student's terminal, and the delay applied to the signal received by the student's terminal will be decreased. As such, when the teacher replies to the student's question, the teacher's reply may be output from the student's terminal without incurring a large delay.

In one embodiment of the invention the delay introduced at the near end terminal may be arranged to be proportional to the duration of voice inactivity on the near end signal. For example if it is detected that the user of the near end terminal has not been recently active, the delay introduced by the jitter buffer on the far end signal may be increased above a threshold value. Conversely, if it is detected that the user of the near end terminal has been recently active, the delay introduced by the jitter buffer on the far end signal may be lowered below a threshold value.

Figure 3:
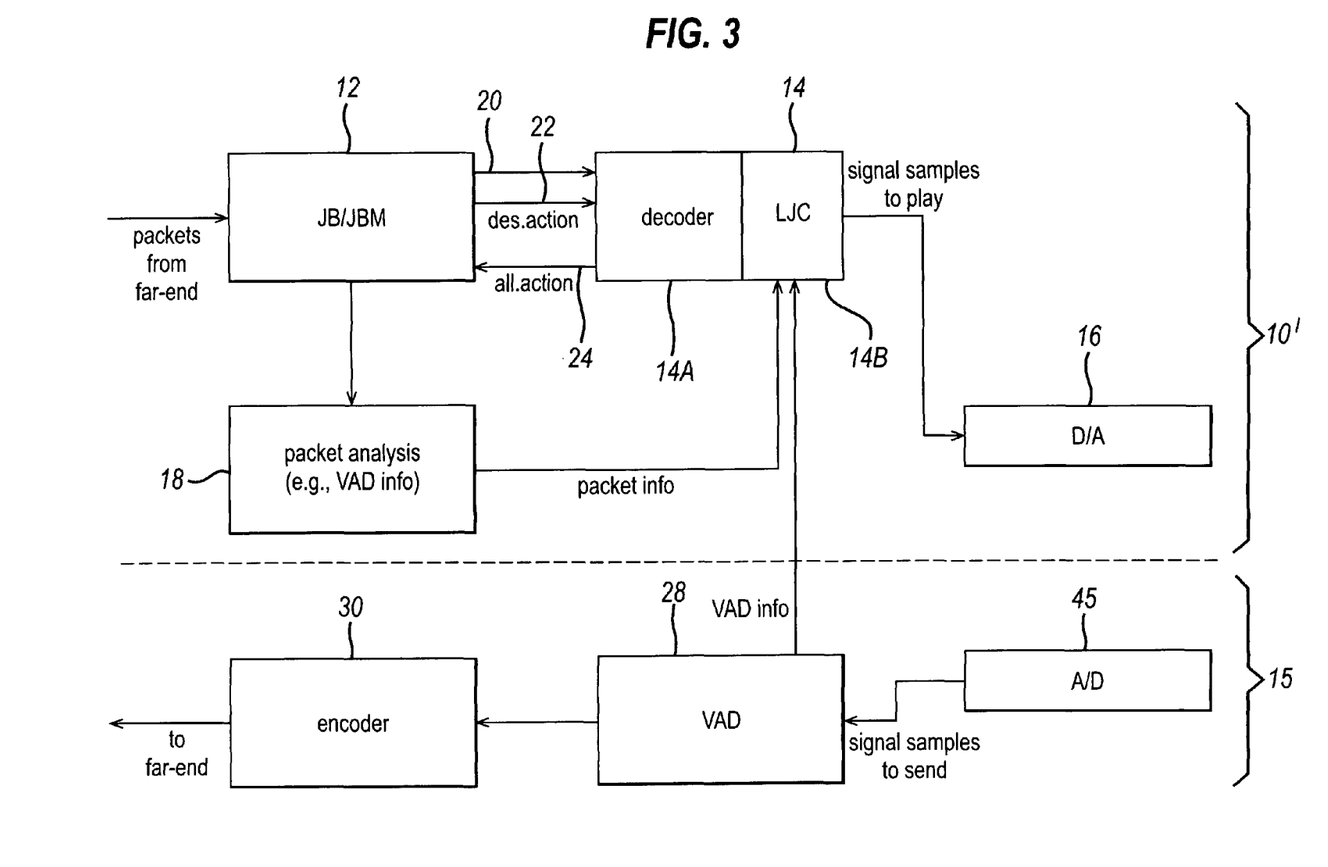
FIG. 3 is a diagram showing receiving and transmitting circuitry according to an embodiment of the present invention.

The manner in which an embodiment of the invention may be implemented will now be described with reference to FIG. 3. FIG. 3 shows the receiving circuitry 10' and transmitting circuitry 15 of the near end terminal 112 according to an embodiment of the present invention. The components in the receiving circuitry that are described in relation to FIG. 2, are referred to in FIG. 3 using like reference numerals. It will be readily appreciated that the receiving circuitry and the transmitting circuitry described in relation to FIG. 3 may be present in both the far end terminal 100 and the near end terminal 112.

The transmitting circuitry 15 is arranged to transmit a near end signal input at the near end terminal 112 to the far end terminal 100. The transmitting circuitry includes an analogue to digital converter 45 for converting analogue information, such as data received from a microphone, to digital information, and an encoder 30 for encoding the near end signal before it is transmitted.

According to an embodiment of the invention the transmitting circuitry 15 also includes a voice activity detector 28. The voice activity detector is arranged to detect voice activity on the near end signal that is received from the analogue to digital converter 45. The voice activity detector 28 outputs an indication of whether voice is present on the near end signal to the decoder block 14.

The decoder block 14 also receives a bit stream from the jitter buffer unit indicated by connection 20, and a calculated delay from the jitter buffer unit indicated by connection 22. The calculated delay may be calculated by the jitter buffer manager based on the far end signal propagation delay.

According to one embodiment of the invention the LJC unit 14b of the decoder block 14 is arranged to control the delay applied to the far end signal in dependence on the voice activity detected on the near end signal. Based on the output from the voice activity detector 28, the LJC unit 14b is arranged to adjust the calculated delay output from the jitter buffer manager of the jitter buffer unit 12. For example if it is detected that the user of the near end terminal has been recently inactive, the delay applied to the far end signal may be increased above the value calculated by the jitter buffer unit. Conversely, if it is detected that the user of the near end terminal has been recently active, the delay applied to the far end signal may be lowered below the value calculated by the jitter buffer unit.

In one embodiment of the invention the adjusted delay is applied during periods of voice inactivity on the far end signal. The voice activity detector 18 is also arranged to output an indication of voice activity in the far end signal to the decoder unit 14 such that the adjusted delay may be applied to the far end signal during periods of voice inactivity on the far end signal.

Figure 4:
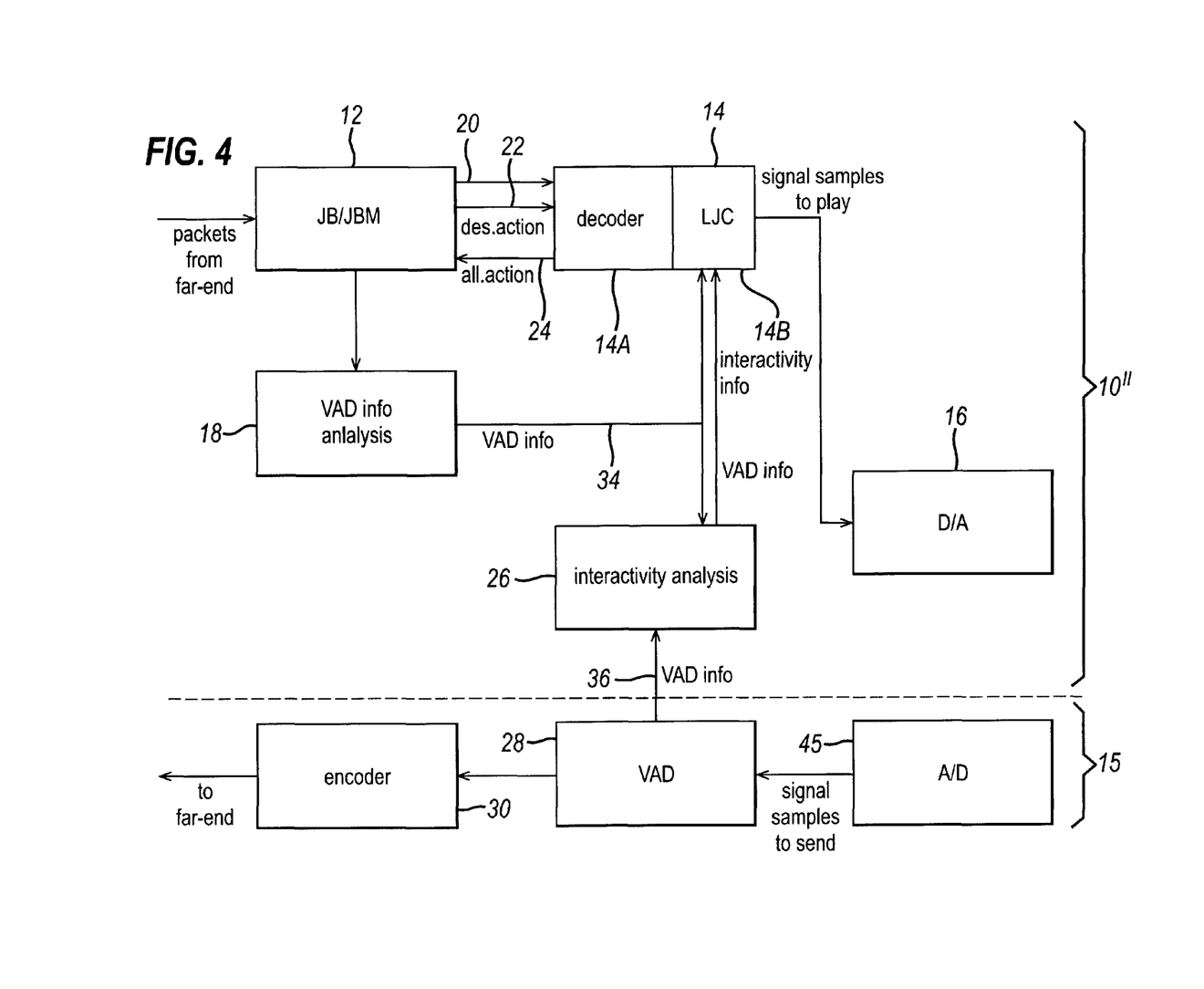
FIG. 4 is a diagram showing receiving and transmitting circuitry according to an alternative embodiment of the present invention.

FIG. 4 shows the receiving circuitry 10″ and transmitting circuitry 15 according to an alternative embodiment of the present invention. The components in the receiving circuitry that are described in relation to FIG. 3, are referred to in FIG. 4 using like reference numerals.

In addition to the components described in relation to FIG. 3, the receiving circuitry 10″ shown in FIG. 4 comprises an interactivity analysis block 26 which will be described in more detail hereinafter.

In this embodiment of the invention the near end signal voice activity detector 28 in the transmitting circuitry 15 outputs an indication of whether voice is present on the near end signal to the interactivity analysis block 26.

The far end signal voice activity detector 18 is arranged to detect voice on the far end signal and output an indication of whether voice is present on the far end signal to the interactivity analysis block 26.

According to one embodiment of the invention the interactivity analysis block 26 is arranged to determine the total number of periods of voice activity, or 'speech turns' on the far end signal and the near end signal to determine the interactivity of the conversation during a recent period of the communication. If the total number of speech turns is greater than a threshold value, this indicates that the conversation is highly interactive and the interactivity analysis block 26 is arranged to output an indication to the decoder block 14 that the delay applied to the far end signal should be decreased. If however the number of speech turns is less than a threshold value, this indicates that the conversation is not particularly interactive and the interactivity analysis block 26 is arranged to output an indication to the decoder that the delay applied to the far end signal should be increased.

In a preferred embodiment of the invention the interactivity analysis block is arranged to take into account the recent history of the near end and far end signal characteristics to determine the interactivity of the conversation.

In one embodiment of the invention the interactivity analysis block 26 may be arranged to compare the total number of speech turns during one period with the total number of speech turns for a previous period to determine how the interactivity of the conversation is changing over time. If the number of speech turns during the first period has increased compared to the number of speech turns during the previous period, the delay may be decreased.

On receipt of an indication to increase the delay from the interactivity analysis block 26, the decoder block 14 is arranged to increase the delay to be applied to the signal to more than the delay calculated by the jitter buffer manager. The delay may be increased by a predetermined amount. Otherwise the delay may be increased in dependence on the change in the proportion of voice activity between periods. This may be indicated to the decoder block 14 by the interactivity analysis block 26.

Conversely, on receipt of an indication to decrease the delay from the interactivity analysis block 26, the decoder block 14 is arranged to decrease the delay to be applied to the signal to less than the delay calculated by the jitter buffer manager. The delay may be decreased by a predetermined amount. Otherwise the delay may be decreased in dependence on the change in the proportion of voice activity between periods. This may be indicated to the decoder unit by the interactivity analysis block 26.

The voice activity detector 18 is also arranged to output an indication of voice activity in the far end signal to the decoder unit 14 such that the adjusted delay may be applied to the far end signal during periods of voice inactivity on the far end signal.

Figure 5:
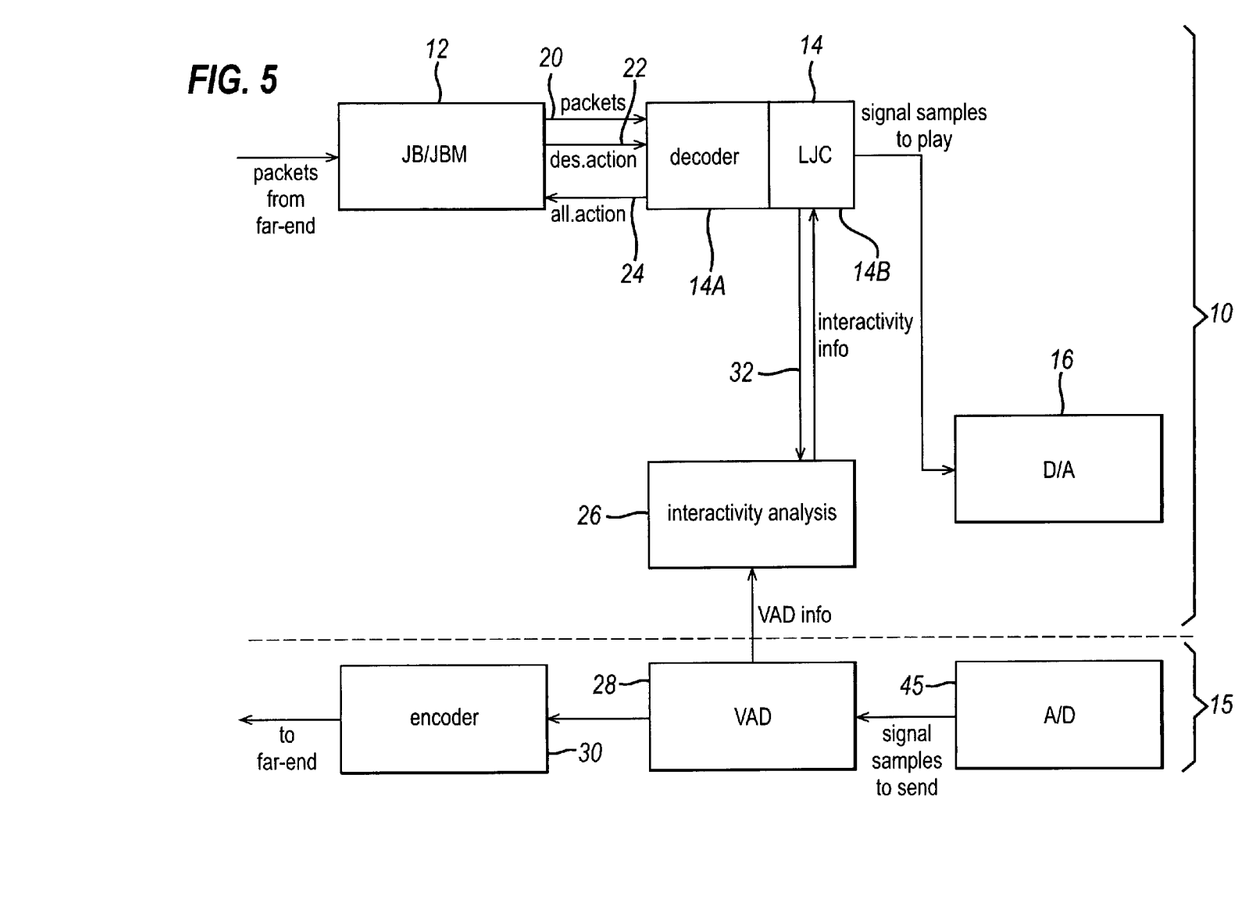
FIG. 5 is a diagram showing receiving and transmitting circuitry according to an alternative embodiment of the present invention.

The LJC unit 14b may be arranged to perform voice activity detection on the received far end signal. This embodiment is shown in FIG. 5.

The LJC unit 14b is arranged to report an indication of voice activity to the interactivity analysis block 26 as shown by connection 32. In this embodiment of the invention the separate far end signal voice activity detector 18 is not required.

In an alternative embodiment of the present invention the near end terminal 112 may comprise a mute feature that allows the user of the terminal to mute the microphone, such that no information may be input using the microphone. Alternatively, if the user of the near end terminal 112 is a participant in a conference call a host of the conference call may mute the near end terminal. In this embodiment of the invention the delay applied to the far end signal may be increased based on detection of a mute condition at the near end terminal.

In one embodiment of the invention the mute condition may be detected by the near end signal voice activity detector 28. By analysing the near end signal the voice activity detector may detect that no information is present on the signal and thus determine that the microphone is muted. The output of the voice activity detector 28 to either the interactivity block 26 (as described in relation to FIG. 4 or 5) or the decoder block 14 (as described in relation to FIG. 3) may indicate that no speech is present on the near end signal. As such the delay may be adjusted in the manner described previously, for example the delay will be increased above the delay calculated by the jitter buffer manager.

In a preferred embodiment of the invention the mute condition may be reported directly to the decoder block 14. As soon as the mute feature is activated, a central processor in the terminal may be arranged to report the mute condition to the decoder. As no voice activity will be present in the near end signal until the mute feature is deactivated the LJC unit may immediately increase the delay applied to the far end signal. When the mute condition is deactivated, or there is an indication that the mute condition will be deactivated, the LJC unit may apply the delay to the far end signal that is calculated by the jitter buffer.

In an alternative embodiment of the invention, the relative durations of voice activity on the near signal and the far end signal may be used to control the delay introduced to the far end signal at the near end terminal. For example if the duration of a period of voice activity in the near end signal is greater than the duration of a period of voice activity in the far end signal, the delay introduced by the jitter buffer on the far end signal may be lowered below a threshold value. Otherwise if the duration of a period of voice activity in the near end signal is less than the duration of a period of voice activity in the far end signal, the delay introduced by the jitter buffer on the far end signal may be raised above a threshold value.

In an alternative embodiment of the invention the voice activity information in the near end signal and the far end signal may be provided to the jitter buffer block. In this embodiment of the invention the jitter buffer manager is arranged to calculate the delay to be applied to the far end signal from the propagation delay of the signal in the network and the voice activity information on the near end and far end signals in accordance with the methods described above.

In preferred embodiments of the invention the information received and transmitted from the terminal is speech. However embodiments of the invention are not limited to the communication of speech. For example in one embodiment of the invention music may be transmitted between the terminals 100 and 112.

The inventors of the present invention have identified that signal processing steps that have an effect on the perceived quality of the received signal may be carried out in dependence on periods of voice activity on the near end signal since it may be assumed that the user of the near end terminal is less perceptive to signal distortion during these periods.

In particular, the inventors have identified that a further advantage of controlling the delay in response to information on the near end signal is that the delay may be adapted during periods when the user of the terminal 112 is speaking, even when voice on the signal received at the terminal is present. Since the user of the terminal 112 is speaking, it can be assumed that the user is less aware of distortions in the signal output at the terminal 112. Therefore changes in the speed of the signal received at terminal 112 will be less noticeable to the user of terminal 112.

According to an embodiment of the invention, the input received by the decoder block 14 from the near end signal voice activity detector 28 (as shown in FIG. 3) may be used to control when the delay is adjusted in the far end signal. In a preferred embodiment of the invention the LJC unit 14*b* is arranged to adjust the delay in the signal when voice activity is detected on the near end signal. The LJC unit may additionally adjust the delay in the far end signal during periods of voice inactivity on the far end signal and during stable sounds as described previously.

In an alternative embodiment of the invention the adjustment to the delay applied to the far end signal may be controlled to be proportional to the power detected on the near end signal. As such when the power is low, for example below a threshold value, the user of the terminal may be considered to be silent and the adjustment to the delay applied to the receiver may be reduced. Conversely, if the power increases the adjustment to the delay applied to the far end signal may be increased by a proportional amount.

In a further alternative embodiment of the invention, other processing operations on the far end signal may be carried out in dependence of voice activity on the near end signal. For example in one embodiment of the invention a post processing method applied to a decoded signal received at a terminal may be adjusted in dependence on voice activity detected on the near end signal. This embodiment will be described with reference to FIG. 6.

Figure 6:
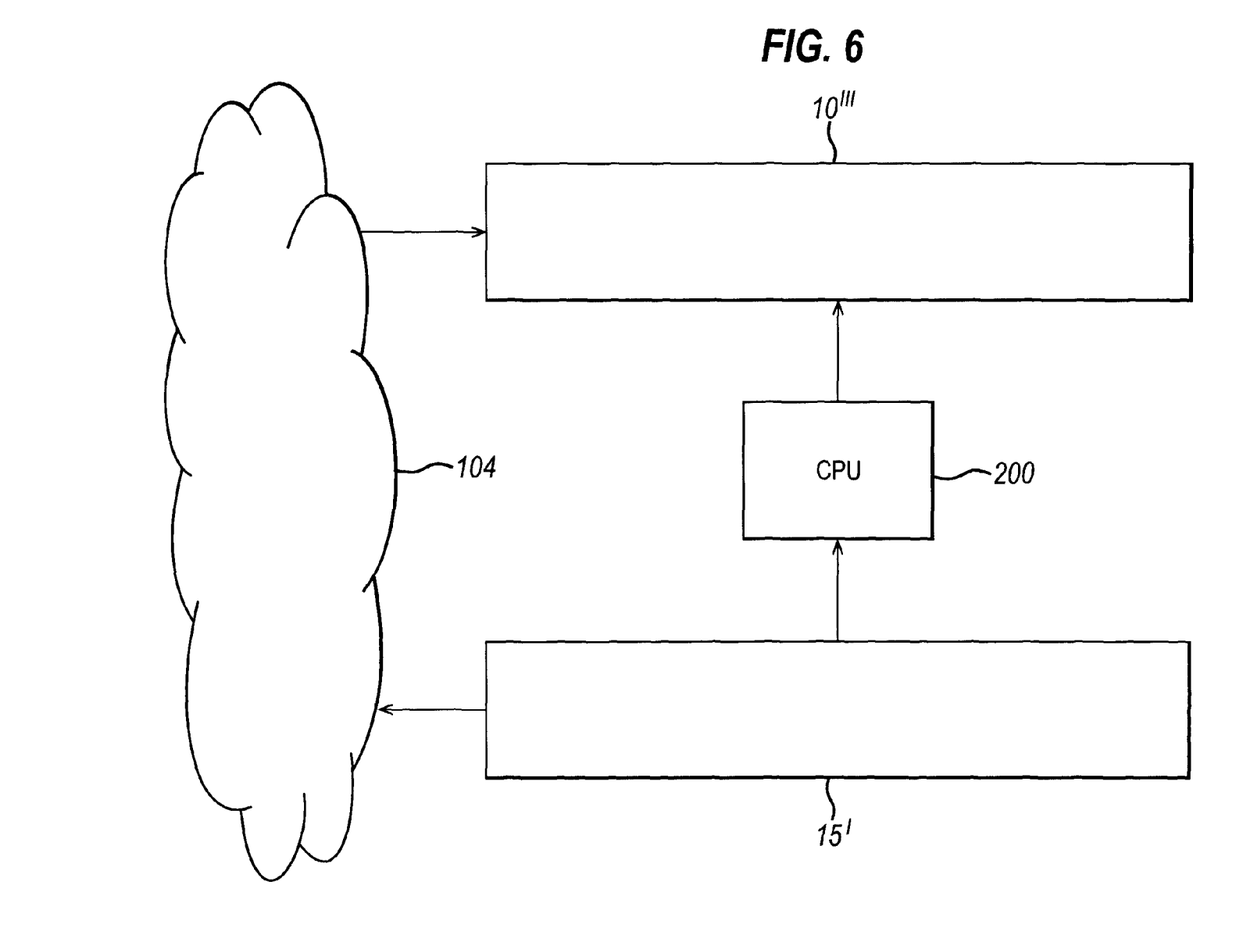
FIG. 6 is a diagram showing receiving and transmitting circuitry according to an alternative embodiment of the present invention.

FIG. 6 which shows receiving circuitry 10''', transmitting circuitry 15' and a CPU (Central Processing Unit) 200 of a terminal connected to a PSTN network 104. The receiving circuitry 10''' is arranged to process a signal received from the network to increase the perceived quality of the signal using a post processing technique. The post processing technique may relate to, but is not limited to, bandwidth extension, receiver-based noise reduction, or post filtering methods.

In accordance with an embodiment of the invention the CPU is arranged to suspend the post processing technique implemented in the receiving circuitry in response to an indication of voice activity on a signal transmitted from the terminal to the network. The indication of voice activity may be provided by a signal from the transmitting circuitry 15'.

According to this embodiment of the invention the additional processing power required by the post processing method may be saved during periods when a user of the terminal is speaking and therefore less aware of the quality of the received signal.

While this invention has been particularly shown and described with reference to preferred embodiments, it will be understood to those skilled in the art that various changes in form and detail may be made without departing from the scope of the invention as defined by the claims.

What is claimed is:

1. A method comprising:
   receiving at a terminal, via a communication network, a first signal comprising a plurality of data elements;
   analysing characteristics of the first signal;
   receiving from a user of the terminal a second signal to be transmitted from the terminal;
   analysing characteristics of the second signal to detect audio activity relating to voice activity in the second signal;
   detecting a presence of voice activity in the first signal based on the analysed characteristics of the first signal;
   applying a delay between receiving at the terminal and outputting from the terminal at least one of said plurality of data elements; and
   adjusting the delay based on the analysed characteristics of the first signal and on the detection of audio activity in the second signal, the adjusting the delay comprising:
      determining a frequency that periods of voice activity in the second signal are interrupted by periods of voice activity in the first signal; and
      adjusting the delay based on said determined frequency.

2. A method as claimed in claim 1 wherein adjusting the delay further comprises:
   determining a duration of voice inactivity in the second signal; and
   adjusting the delay based on the duration of voice inactivity in the second signal.

3. A method as claimed in claim 2 wherein adjusting the delay further comprises increasing the delay if the duration of voice inactivity in the second signal exceeds a threshold.

4. A method as claimed in claim 3 wherein the delay is decreased when voice activity is detected in the second signal.

5. A method as claimed in claim 1 wherein adjusting the delay further comprises:
   determining a first number of voice activity periods in the second signal during a period; and
   adjusting the delay based on the first number of voice activity periods in the second signal.

6. A method as claimed in claim 5 further comprising:
   determining a second number of voice activity periods in the first signal during the period; and
   adjusting the delay based on the first number of voice activity periods and the second number of voice activity periods.

7. A method as claimed in claim 6 wherein adjusting the delay further comprises decreasing the delay if the first number of voice activity periods combined with the second number of voice activity periods exceed a predetermined threshold.

8. A method as claimed in claim 6 wherein adjusting the delay further comprises increasing the delay if the first number of voice activity periods combined with the second number of voice activity periods fall below a predetermined threshold.

9. A method as claimed in claim 5 wherein adjusting the delay further comprises decreasing the delay if the first number of voice activity periods exceed a predetermined threshold.

10. A method as claimed in claim 5 wherein adjusting the delay further comprises increasing the delay if the first number of voice activity periods fall below a predetermined threshold.

11. A method as claimed in claim 1 wherein adjusting the delay further comprises:
determining a duration of voice activity in the second signal; and
adjusting the delay based on the duration of voice activity in the second signal to generate the delay.

12. A method as claimed in claim 11 wherein adjusting the delay further comprises:
determining a duration of voice activity in the first signal; and
adjusting the delay based on a comparison of the duration of voice activity in the first signal to the duration of voice activity in the second signal.

13. A method as claimed in claim 12 wherein adjusting the delay further comprises increasing the delay if the duration of voice activity in the first signal exceeds the duration of voice activity in the second signal by a predetermined amount.

14. A method as claimed in claim 12 wherein adjusting the delay further comprises decreasing the delay if the duration of voice activity in the second signal exceeds the duration of voice activity in the first signal by a predetermined amount.

15. A method as claimed in claim 1 wherein the delay is adjusted when voice activity is present in the second signal, irrespective of whether voice activity is present in the first signal.

16. A method as claimed in claim 1 wherein a delay adjustment made by adjusting the delay is determined by:
determining a required delay adjustment from the analysed characteristics of the first signal;
determining a delay adjustment tolerance from the audio activity in the second signal; and
determining the delay adjustment from the required delay adjustment and the delay adjustment tolerance.

17. A method as claimed in claim 16 wherein the required delay adjustment is determined in a jitter buffer unit.

18. A method as claimed in claim 16 wherein the delay adjustment tolerance is determined in a loss and jitter concealment unit of the terminal.

19. A method as claimed in claim 18 wherein the delay adjustment is determined in the loss and jitter concealment unit.

20. A method as claimed in claim 1 wherein analysing characteristics of the second signal comprises determining a power of the second signal.

21. A method as claimed in claim 20 wherein the delay adjustment is proportional to changes in the power of the second signal.

22. A method comprising:
receiving at a terminal a first signal comprising a plurality of data elements;
analysing characteristics of the first signal; detecting if voice activity is present in the first signal based on the analysed characteristics of the first signal;
analysing characteristics of a second signal, that is to be transmitted from the terminal, to detect audio activity relating to voice activity in the second signal;
applying a delay between receiving at the terminal and outputting from the terminal at least one of said plurality of data elements;
adjusting the delay based on;
the analysed characteristics of the first signal;
the detection of audio activity in the second signal; and
a determined frequency that periods of voice activity on the second signal are interrupted by periods of voice activity on the first signal.

23. A method as claimed in claim 22 further comprising decreasing the delay if it is detected that a mute condition is deactivated.

24. A method as claimed in claim 22 wherein the first signal relates to a communication event.

25. A method comprising:
receiving a first signal at a terminal via a communication network, the first signal comprising a plurality of data elements;
receiving from a user of the terminal a second signal to be transmitted from the terminal;
analysing characteristics of the second signal to detect audio activity in the second signal;
detecting a presence of voice activity in the first signal based on analysed characteristics of the first signal;
applying a processing step to at least a portion of the first signal, the processing step suspended when audio activity relating to voice activity in the second signal is detected in the second signal;
applying a delay between receiving at the terminal and outputting from the terminal at least one of said plurality of data elements; and
adjusting the delay based on:
the analysed characteristics of the first signal;
the detection of audio activity in the second signal; and
a determined frequency that periods of voice activity on the second signal are interrupted by periods of voice activity on the first signal.

26. A method as claimed in claim 25 wherein the processing step comprises applying the delay to the first signal when audio activity is detected in the second signal.

27. A method as claimed in claim 25 wherein the processing step relates to bandwidth extension of the first signal.

28. A method as claimed in claim 25 wherein the processing step relates to noise reduction in the first signal.

29. A method as claimed in claim 25 wherein the processing step relates to post filtering of the first signal.

30. A terminal comprising:
a first receiver configured to receive, via a communication network, a first signal comprising a plurality of data elements;
a first analysis unit configured to analyse characteristics of the first signal;
a second receiver configured to receive from a user of the terminal a second signal to be transmitted from the terminal;
a second analysis unit configured to analyse characteristics of the second signal to detect audio activity relating to voice activity in the second signal;
a detecting unit configured to detect a presence of voice activity in the first signal based on the analysed characteristics of the first signal;
a delay unit configured to apply a delay between receiving at the terminal and outputting from the terminal at least one of said plurality of data elements and to adjust the delay based on the analysed characteristics of the first signal and on the detection of audio activity in the second signal, the delay unit configured to adjust the delay by:
determining a frequency that periods of voice activity on the second signal are interrupted by periods of voice activity on the first signal; and
adjusting the delay based on said determined frequency.

* * * * *